(12) United States Patent
Yoo et al.

(10) Patent No.: US 11,136,038 B2
(45) Date of Patent: Oct. 5, 2021

(54) APPARATUS AND METHOD FOR PROVIDING SAFETY STRATEGY IN VEHICLE

(71) Applicants: HYUNDAI MOTOR COMPANY, Seoul (KR); KIA MOTORS CORPORATION, Seoul (KR)

(72) Inventors: Su Jung Yoo, Incheon (KR); Jun Soo Kim, Seoul (KR); Dong Hwi Lee, Suwon-si (KR); Jin Su Jeong, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 236 days.

(21) Appl. No.: 16/376,661

(22) Filed: Apr. 5, 2019

(65) Prior Publication Data
US 2019/0315366 A1    Oct. 17, 2019

Related U.S. Application Data

(60) Provisional application No. 62/655,831, filed on Apr. 11, 2018.

(30) Foreign Application Priority Data

Feb. 1, 2019    (KR) ........................ 10-2019-0013932

(51) Int. Cl.
*B60W 30/18*    (2012.01)
*B60W 50/00*    (2006.01)

(52) U.S. Cl.
CPC .. *B60W 30/18163* (2013.01); *B60W 50/0098* (2013.01); *B60W 2552/00* (2020.02)

(58) Field of Classification Search
CPC ......... B60W 50/0098; B60W 2552/00; B60W 60/0053; B60W 30/181; B60W 30/143;
(Continued)

(56) References Cited

U.S. PATENT DOCUMENTS 5,521,579 A    5/1996  Bernhard
6,055,467 A    4/2000  Mehring et al.
(Continued)

FOREIGN PATENT DOCUMENTS

DE    198 21 122 A1    6/1999
DE    101 14 187 A1    9/2002
(Continued)

OTHER PUBLICATIONS

Office Action dated Aug. 12, 2020 from the corresponding U.S. Appl. No. 16/192,279, 60 pages.
(Continued)

*Primary Examiner* — Marthe Y Marc-Coleman

(57) ABSTRACT

An apparatus for providing a safety strategy in a vehicle is provided. The apparatus includes a sensor configured to sense information about an external object and a control circuit configured to be electrically connected with the sensor. The control circuit is configured to initiate a minimum risk strategy (MRM), when a predetermined condition is met, to determine a lateral location of the vehicle based on information obtained by the sensor and a location of a driving lane of the vehicle on a road, and to move the vehicle to the determined lateral location while executing the MRM.

15 Claims, 9 Drawing Sheets

(58) Field of Classification Search
CPC .. B60W 30/10; B60W 2554/00; B60W 10/06; B60W 10/18; B60W 10/20; B60W 50/14; B60W 2050/0043; B60W 2050/146; B60W 2710/06; B60W 2710/18; B60W 2710/20; B60K 28/06

See application file for complete search history.

(56) References Cited

U.S. PATENT DOCUMENTS

| | | |
|---|---|---|
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,315,178 B1 | 4/2016 | Ferguson et al. |
| 9,527,441 B2 | 12/2016 | Matsumura |
| 9,874,871 B1 | 1/2018 | Zhu et al. |
| 10,183,668 B2 | 1/2019 | Takae |
| 10,324,463 B1 | 6/2019 | Konrady et al. |
| 10,449,856 B2 | 10/2019 | Kojima |
| 10,451,730 B2 | 10/2019 | Talamonti et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1 | 11/2010 | Seder et al. |
| 2011/0169625 A1 | 7/2011 | James et al. |
| 2011/0196592 A1 | 8/2011 | Kashi et al. |
| 2011/0241862 A1* | 10/2011 | Debouk ............. B60W 50/035 340/439 |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2014/0074356 A1 | 3/2014 | Bone |
| 2015/0006012 A1 | 1/2015 | Kammel et al. |
| 2015/0006013 A1 | 1/2015 | Wimmer et al. |
| 2015/0019063 A1 | 1/2015 | Lu et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0339913 A1 | 11/2016 | Yamashita et al. |
| 2016/0349066 A1 | 12/2016 | Chung et al. |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0108865 A1 | 4/2017 | Rohde et al. |
| 2017/0124882 A1 | 5/2017 | Wang |
| 2017/0171375 A1 | 6/2017 | Kamata |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0240172 A1 | 8/2017 | Nishiguchi et al. |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0313313 A1 | 11/2017 | Asakura |
| 2017/0315556 A1 | 11/2017 | Mimura |
| 2017/0334460 A1 | 11/2017 | Arakawa et al. |
| 2017/0341652 A1 | 11/2017 | Sugawara et al. |
| 2017/0341653 A1 | 11/2017 | Kubota et al. |
| 2017/0349212 A1 | 12/2017 | Oshida et al. |
| 2017/0368936 A1 | 12/2017 | Kojima |
| 2018/0009437 A1 | 1/2018 | Ooba |
| 2018/0029604 A1* | 2/2018 | Niino ................ B60W 10/20 |
| 2018/0033309 A1 | 2/2018 | Norwood |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1 | 6/2018 | Kabe |
| 2018/0162416 A1 | 6/2018 | Honda et al. |
| 2018/0170370 A1 | 6/2018 | Kataoka |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto |
| 2018/0178802 A1 | 6/2018 | Miyata |
| 2018/0186376 A1 | 7/2018 | Lee et al. |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1* | 12/2018 | Ungermann ............ B60T 7/085 |
| 2018/0370542 A1 | 12/2018 | Braunagel et al. |
| 2018/0370544 A1 | 12/2018 | Kitagawa |

(56) References Cited

U.S. PATENT DOCUMENTS

| | | |
|---|---|---|
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0047469 A1 | 2/2019 | Nishoguchi |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0135290 A1 | 5/2019 | Marden et al. |
| 2019/0155279 A1 | 5/2019 | Tayama |
| 2019/0161117 A1 | 5/2019 | Suzuki |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241198 A1 | 8/2019 | Mori et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |
| 2021/0188258 A1 | 6/2021 | Goto et al. |
| 2021/0188262 A1 | 6/2021 | Goto et al. |
| 2021/0188356 A1 | 6/2021 | Goto et al. |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001 405 A1 | 11/2012 |
| DE | 10 2011 109 618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007 187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2000-198458 A | 7/2000 |
| JP | 2003-025868 A | 1/2003 |
| JP | 2015-138330 A | 7/2015 |
| JP | 2016-000602 A | 1/2016 |
| JP | 2016-151815 A | 8/2016 |
| JP | 2016-196285 A | 11/2016 |
| JP | 2019-043169 A | 3/2019 |
| KR | 10-0578573 B2 | 5/2006 |
| KR | 101779823 B1 | 10/2017 |
| KR | 20180070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | WO 2017064941 A1 | 4/2017 |
| WO | 2017-168013 A1 | 10/2017 |
| WO | WO 2017168013 A1 | 10/2017 |
| WO | 2018-033389 A1 | 2/2018 |
| WO | 2017-017793 A1 | 6/2018 |

OTHER PUBLICATIONS

Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884, 25 pp.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.

(56) References Cited

OTHER PUBLICATIONS

European Search Report dated Oct. 23, 2019 from the corresponding European Application No. 19167266.6, 9 pages.
U.S. Office Action for U.S. Appl. No. 16/204,362 dated Oct. 16, 2019, 32 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Office Action dated Jun. 1, 2021 from the corresponding U.S. Appl. No. 16/192,279, 39 pp.
Non-Final Office Action, dated Jun. 11, 2021 in corresponding U.S. Appl. No. 16/372,966, 8 pages.
Non-Final Office Action, dated Jun. 22, 2021 in corresponding U.S. Appl. No. 16/367,433, 16 pages.
Final Office Action, dated Jul. 14, 2021 in corresponding U.S. Appl. No. 16/376,576, 43 pages.
Final Office Action, dated Jul. 19, 2021 in corresponding U.S. Appl. No. 16/299,547, 14 pages.
Final Office Action, dated Jul. 23, 2021 in corresponding U.S. Appl. No. 16/378,181, 15 pages.
Office Action dated Aug. 3, 2021 from EP Application 19 167 267.1-1012, 5 pages.
Non-Final Office Action, dated Aug. 13, 2021 in corresponding U.S. Appl. No. 16/378,203, 28 pages.

* cited by examiner

APPARATUS AND METHOD FOR PROVIDING SAFETY STRATEGY IN VEHICLE

CROSS-REFERENCE TO RELATED APPLICATION

The present application claims priority to and the benefit of Korean Patent Application No. 10-2019-0013932, filed on Feb. 1, 2019, which claims priority to and the benefit of U.S. Patent Application No. 62/655,831, filed on Apr. 11, 2018, the entire contents of which are incorporated herein by reference.

TECHNICAL FIELD

The present disclosure relates to an apparatus and method for providing a strategy for the maintenance of safety depending on the occurrence of an event.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). The autonomous system may detect a critical situation and may provide a minimum risk maneuver (MRM) when sensing the critical situation.

The above-mentioned MRM may include, for example, stopping control in a driving lane, stopping control in a shoulder, or the like. When there is no shoulder in a road, the stopping control in the driving lane may put another surrounding vehicle as well as the vehicle in danger. Thus, when there is no space to safely stop, for example, a shoulder in the road, there is a need for providing a strategy for safe stopping control.

SUMMARY

An aspect of the present disclosure provides an apparatus and method for enhancing safety of a minimum risk strategy (MRM).

The technical problems to be solved by the present inventive concept are not limited to the aforementioned problems, and any other technical problems not mentioned herein will be clearly understood from the following description by those skilled in the art to which the present disclosure pertains.

In some forms of the present disclosure, an apparatus for providing a safety strategy in a vehicle may include: a sensor configured to sense information about an external object and a control circuit configured to be electrically connected with the sensor. The control circuit may be configured to initiate a minimum risk strategy (MRM), when a predetermined condition is met, determine a lateral location of the vehicle based on information obtained by the sensor and a location of a driving lane of the vehicle in a road, and control the vehicle to move to the determined lateral location while executing the MRM.

In some forms of the present disclosure, the control circuit may be configured to perform stopping control or deceleration control according to the MRM.

In some forms of the present disclosure, the control circuit may be configured to control the vehicle to be adjacent to one end of the road while executing the MRM, when the driving lane is neighboring to the one end of the road.

In some forms of the present disclosure, the control circuit may be configured to perform a lane change to a lane neighboring to one end of the road, when the driving lane is not neighboring to the one end of the road and control the vehicle to be adjacent to the one end of the road, the one end being neighboring to the changed lane, while executing the MRM.

In some forms of the present disclosure, the control circuit may be configured to perform a lane change to a lane close to the driving lane between a lane neighboring to a left end of the road or a lane neighboring to a right end of the road.

In some forms of the present disclosure, the control circuit may be configured to perform a lane change to a lane capable of being changed within a specified time between a lane neighboring to a left end of the road or a lane neighboring to a right end of the road.

In some forms of the present disclosure, the control circuit may be configured to control the vehicle to be located on the center of the driving lane while executing the MRM, when the driving lane is not neighboring to one end of the road.

In some forms of the present disclosure, the control circuit may be configured to control the vehicle to be located on the center of the driving lane, when it is impossible to perform a lane change within a specified time.

In some forms of the present disclosure, the control circuit may be configured to control the vehicle to move to a shoulder while executing the MRM, when the shoulder is included in the road.

In some forms of the present disclosure, the control circuit may be configured to control the vehicle to move to the shoulder, when it is possible to perform a lane change to the shoulder within a specified time.

In some forms of the present disclosure, a method for providing a safety strategy in a vehicle may include: initiating an MRM, when a predetermined condition is met, determining a lateral location of the vehicle based on sensor information and a location of a driving lane of the vehicle in a road, and controlling the vehicle to move to the determined lateral location while executing the MRM.

In some forms of the present disclosure, the controlling may include performing stopping control or deceleration control according to the MRM.

In some forms of the present disclosure, the controlling may include controlling the vehicle to be adjacent to one end of the road while executing the MRM, when the driving lane is neighboring to the one end of the road.

In some forms of the present disclosure, the controlling may include performing a lane change to a lane neighboring to one end of the road, when the driving lane is not neighboring to the one end of the road and controlling the vehicle to be adjacent to the one end of the road, the one end being neighboring to the changed lane, while executing the MRM.

In some forms of the present disclosure, the controlling may include controlling the vehicle to be located on the center of the driving lane while executing the MRM, when the driving lane is not neighboring to one end of the road.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
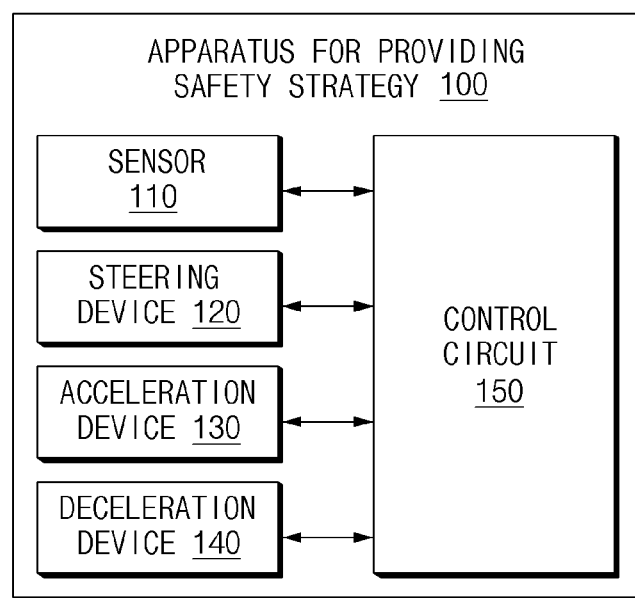
FIG. 1 is a block diagram illustrating a configuration of an apparatus for providing a safety strategy in a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing elements of some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for providing a safety strategy in a vehicle in some forms of the present disclosure.

Referring to FIG. 1, an apparatus 100 for providing a safety strategy in a vehicle in some forms of the present disclosure may include a sensor 110, a steering device 120, an acceleration device 130, a deceleration device 140, and a control circuit 150. The apparatus 100 for providing the safety strategy in FIG. 1 may be a portion of an autonomous system and may be loaded into the vehicle.

The sensor 110 may be configured to sense information about the outside and inside of the vehicle. For example, the sensor 110 may be configured to sense information about an external object. The sensor 110 may include a radar, a light detection and ranging (LiDAR), a camera, and the like, for sensing an environment outside the vehicle. For another example, the sensor 110 may include a wheel speed sensor, a yaw rate sensor, an acceleration sensor, a torque sensor, and the like, for sensing a state of the vehicle.

The steering device 120 may be configured to control a steering angle of the vehicle. The steering device 120 may include, for example, a steering wheel, an actuator interlocked with the steering wheel, and a controller for controlling the actuator and may be controlled by a driver of the vehicle and/or the autonomous system.

The acceleration device 130 may be configured to control acceleration of the vehicle. The acceleration device 130 may include, for example, a throttle, an actuator interlocked with the throttle, and a controller for controlling the actuator and may be controlled by the driver and/or the autonomous system.

The deceleration device 140 may be configured to control deceleration of the vehicle. The deceleration device 140 may include, for example, a brake, an actuator interlocked with the brake, and a controller for controlling the actuator and may be controlled by the driver and/or the autonomous system.

The control circuit 150 may be electrically connected with the sensor 110, the steering device 120, the acceleration device 130, and the deceleration device 140. The control circuit 150 may control the sensor 110, the steering device 120, the acceleration device 130, and the deceleration device 140, and may perform a variety of data processing and various arithmetic operations. The control circuit 150 may be, for example, an electronic control unit (ECU), a micro controller unit (MCU), or a sub-controller, which is loaded into the vehicle.

In some forms of the present disclosure, when a predetermined condition is met, the control circuit 150 may initiate a minimum risk maneuver (MRM). For example, after a transition demand (TD) occurs, when control authority is not handed over or when an emergency critical situation is detected, the control circuit 150 may execute the MRM. The control circuit 150 may perform stopping control or deceleration control according to a predetermined MRM.

In some forms of the present disclosure, the control circuit 150 may determine a lateral location of the vehicle based on information obtained by the sensor 110 and a location of a driving lane of the vehicle in a road. The control circuit 150 may obtain information about an external object using the sensor 110. The control circuit 150 may obtain information about whether a lane where the vehicle is located is an nth lane in a road on which the vehicle is traveling. When executing an MRM based on the information, the control circuit 150 may determine a target lateral location of the vehicle. For example, the control circuit 150 may determine the target lateral location as a location adjacent to a left or right end of the driving lane or the center of the driving lane. The control circuit 150 may control the vehicle to move to the determined lateral location while executing the MRM. After moving the vehicle to the determined lateral location, the control circuit 150 may perform stopping control or deceleration control.

In some forms of the present disclosure, while the driving lane is neighboring to one end of the road on which the vehicle is traveling, the control circuit 150 may control the vehicle to be adjacent to the one end of the road while executing an MRM. When the driving lane is not neighboring to the one end of the road, the control circuit 150 may perform a lane change to a lane neighboring to the one end of the road and may control the vehicle to be adjacent to the one end of the road neighboring to the changed lane. For example, the control circuit 150 may perform a lane change to a lane close to the driving lane between a lane neighboring to the left end of the road or a lane neighboring to the right end of the road. For another example, the control circuit 150 may perform a lane change to a lane capable of being changed within a specified time between the lane neighboring to the left end of the road or the lane neighboring to the right end of the road. For another example, the control circuit 150 may perform a lane change to a lane in a predetermined direction between the lane neighboring to the left end of the road or the lane neighboring to the right end of the road. After performing the lane change, the control circuit 150 may control the vehicle to be adjacent to the one end of the road.

When a shoulder is not included in the road on which the vehicle is traveling, the vehicle may be stopped as close to a road edge as possible by calculating a distance from an outermost lane to the road edge, without stopping the lane center. Thus, a remote vehicle may be easy to avoid the stopped vehicle to reduce a risk of collision.

In some forms of the present disclosure, when the driving lane is not neighboring to one end of the road, the control circuit 150 may control the vehicle to be located on the center of the driving lane while executing an MRM. For example, when it is impossible to perform a lane change within a specified time (when a risk of collision is high upon a lane change), the control circuit 150 may control the vehicle to be located on the center of the driving lane without performing the lane change.

In some forms of the present disclosure, when a shoulder is included in the road, the control circuit 150 may control the vehicle to move to the shoulder while executing an MRM. For example, when it is possible to perform a lane change to the shoulder within a specified time (when there is no risk of collision upon a lane change), the control circuit 150 may control the vehicle to move to the shoulder. After the vehicle moves to the shoulder, the control circuit 150 may perform stopping control or deceleration control.

Figure 2:
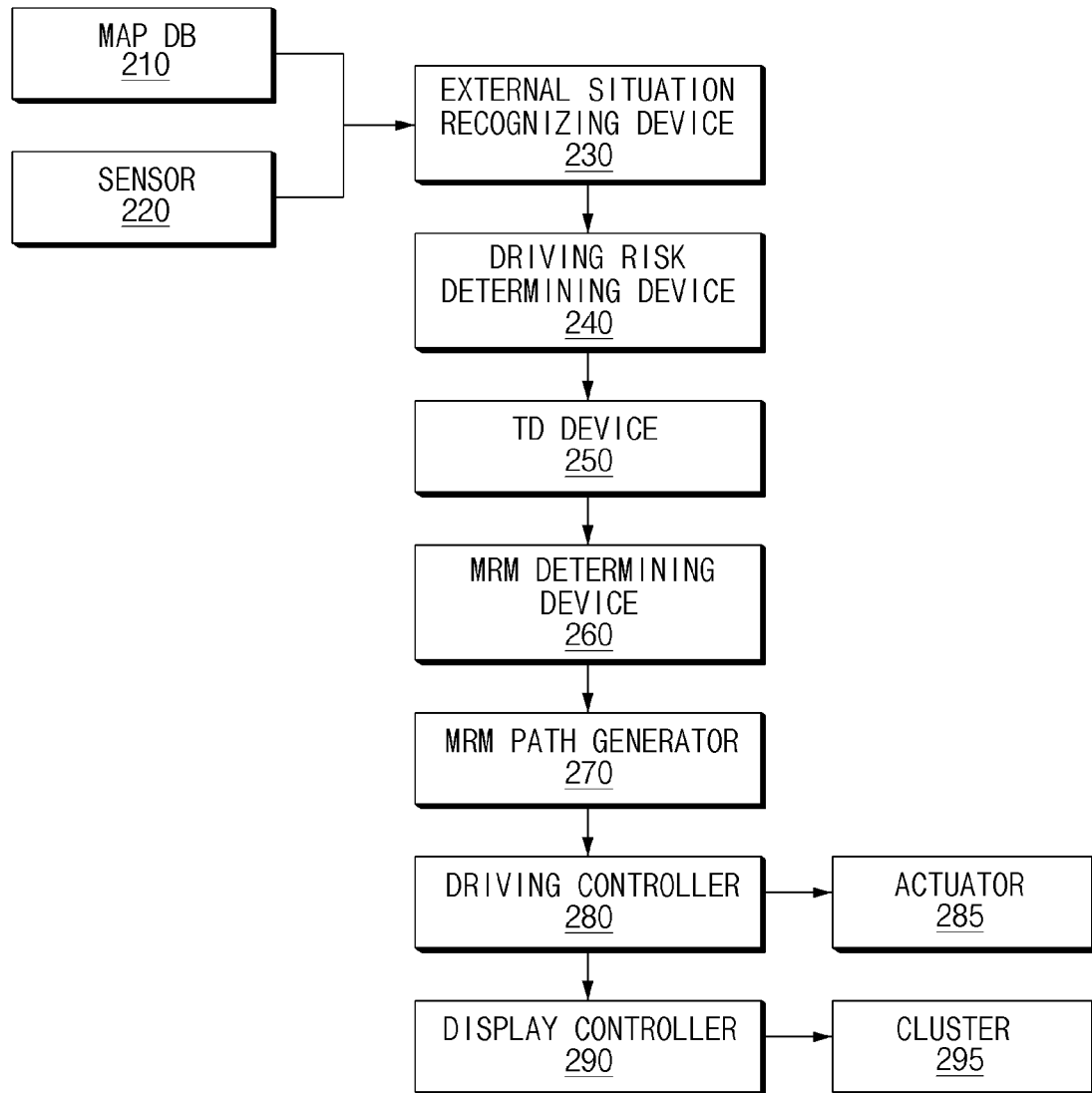
FIG. 2 is a block diagram illustrating a configuration of an apparatus for providing a safety strategy in a vehicle in one form of the present disclosure.

FIG. 2 is a block diagram illustrating a configuration of an apparatus for providing a safety strategy in a vehicle in some forms of the present disclosure.

Referring to FIG. 2, the apparatus for providing the safety strategy in some forms of the present disclosure may include an external situation recognizing device 230, a driving risk determining device 240, a transition demand (TD) device 250, an MRM determining device 260, an MRM path generator 270, a driving controller 280, and a display controller 290. The apparatus for providing the safety strategy may determine a driving risk situation and may provide an MRM suitable for the situation.

The external situation recognizing device 230 may obtain information (e.g., a location, a speed, acceleration, an expected trajectory, and the like) about a static object, such as a structure, a guiderail, and a stopped object, and a moving object, such as an external vehicle, using a sensor 220. The external situation recognizing device 230 may obtain information about a road on which the vehicle is currently traveling (e.g., a type of the road, whether there is a shoulder, and the like), based on a map database (DB) 210.

The driving risk determining device 240 may expect a probability of collision with the static object or the moving object and a departure from an operational design domain (ODD) of autonomous control. The driving risk determining device 240 may recognize an event (e.g., a collision with the static object, a collision with the moving object, a departure from the ODD, or the like) based on the expectation and may predict a time when the event occurs, a location where the event occurs, and the like.

The TD device 250 may provide a TD to a driver of the vehicle. The TD may be changed according to a type of the event and over a time remaining until the event occurs. For example, a type of the TD (e.g., a visual notification, an audible notification, an emergency call, and the like) may be changed, and strength of the TD may be adjusted.

The MRM determining device 260 may determine an MRM suitable for a current situation. The MRM may include constant-speed driving after deceleration, stopping in a driving lane, stopping after a lane change, and the like. The MRM determining device 260 may select an MRM suitable for the current situation among various types of MRMs. When the constant-speed driving is selected, the MRM determining device 260 may calculate a final speed. For example, the MRM determining device 260 may determine whether the detected event is an event capable of performing low-speed driving (e.g., a departure from an ODD, or the like). When the detected event is the event capable of performing the low-speed driving, the MRM determining device 260 may select a strategy for constant-speed driving after deceleration. When there is a shoulder in a road on which the vehicle is traveling, the MRM determining device 260 may determine whether it is possible to perform a lane change to the shoulder. When it is possible to perform the lane change to the shoulder, the MRM determining device 260 may select a strategy for stopping in the shoulder. When there is no shoulder in the road, the MRM determining device 260 may select a strategy for stopping in a lane. When there is no shoulder in the road, the MRM determining device 260 may select the strategy for stopping in the lane and may control the vehicle to stop on a location adjacent to an edge of the road.

The MRM path generator 270 may generate a driving path according to the determined MRM. The MRM path generator 270 may output a location where the vehicle is traveling, a heading angle of the vehicle, and a speed of the vehicle. For example, when the strategy for stopping in the shoulder is selected, the MRM path generator 270 may determine whether it is possible to perform a lane change to the shoulder before an event occurs. When it is possible to perform the lane change to the shoulder, the MRM path generator 270 may generate a driving path for stopping after performing the lane change to the shoulder. When it is impossible to perform the lane change to the shoulder, the MRM path generator 270 may perform stopping control in a driving lane. For another example, when the strategy for stopping in the lane is selected, the MRM path generator 270 may calculate a target lateral location adjacent to a road edge when a current lane is a first lane or a final lane and may generate a driving path for stopping in the target lateral location. When the current lane does not correspond to the first lane or the final lane, the MRM path generator 270 may generate a driving path for stopping on the center of a driving lane.

The driving controller 280 may control a behavior of the vehicle by operating an actuator 285. The driving controller 280 may control the vehicle depending on the generated path.

The display controller 290 may provide visual information to the driver through a cluster 295.

Figure 3:
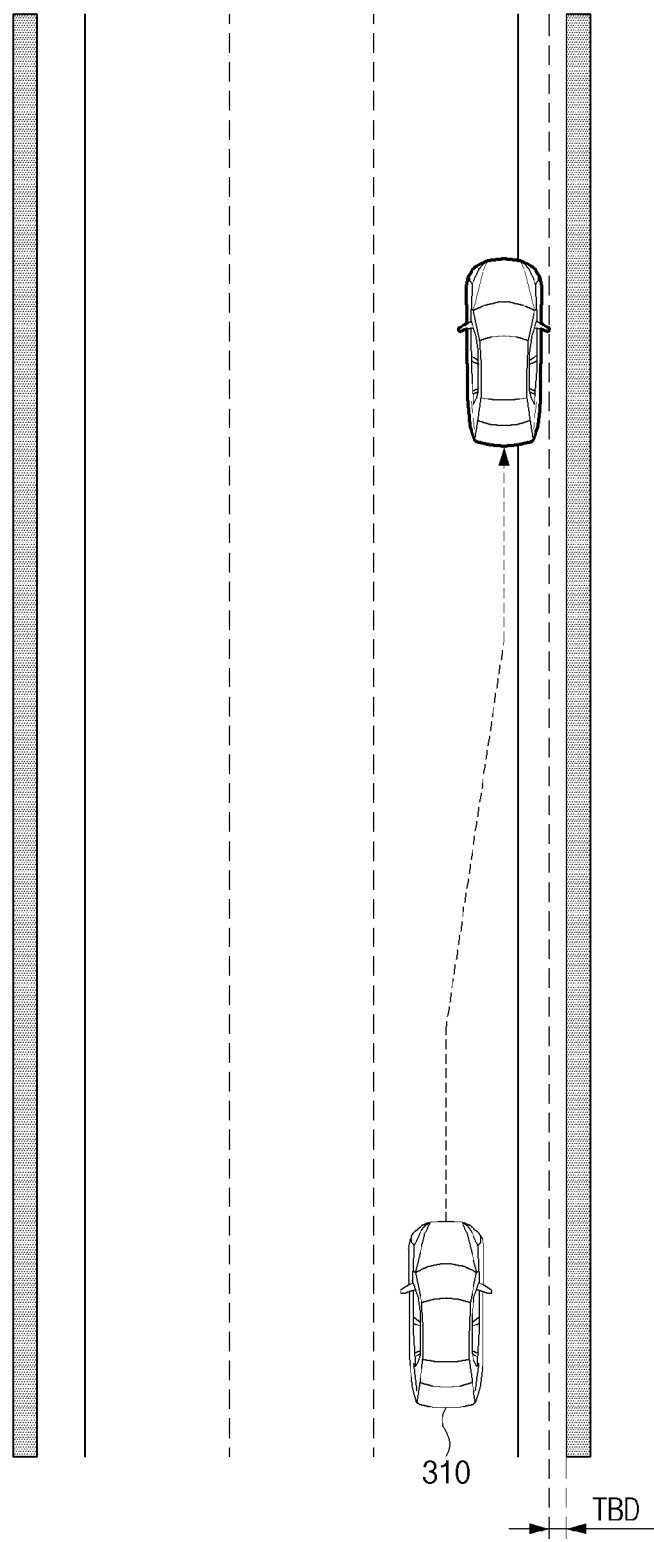
FIG. 3 is a drawing illustrating an exemplary operation of an apparatus for providing a safety strategy in a vehicle in one form of the present disclosure.

FIG. 3 is a drawing illustrating an exemplary operation of an apparatus for providing a safety strategy in a vehicle in some forms of the present disclosure.

Referring to FIG. 3, a vehicle 310 in some forms of the present disclosure may be traveling on a lane adjacent to a right end of a road. The vehicle 310 may perform autonomous control using an autonomous system. While performing the autonomous control, the vehicle 310 may detect an event for requiring to hand over control authority. The vehicle 310 may request its driver to hand over control authority. When the driver does not take over the control authority, the vehicle 310 may initiate an MRM. When the vehicle 310 is traveling on the lane adjacent to the right end of the road, it may execute a strategy for stopping on a location adjacent to the right end of the road. For example, the vehicle 310 may stop on a location away from the right end of the road at a specified distance TBD. Thus, although the vehicle 310 stops, a following vehicle may easily avoid the stopped vehicle 310.

Figure 4:
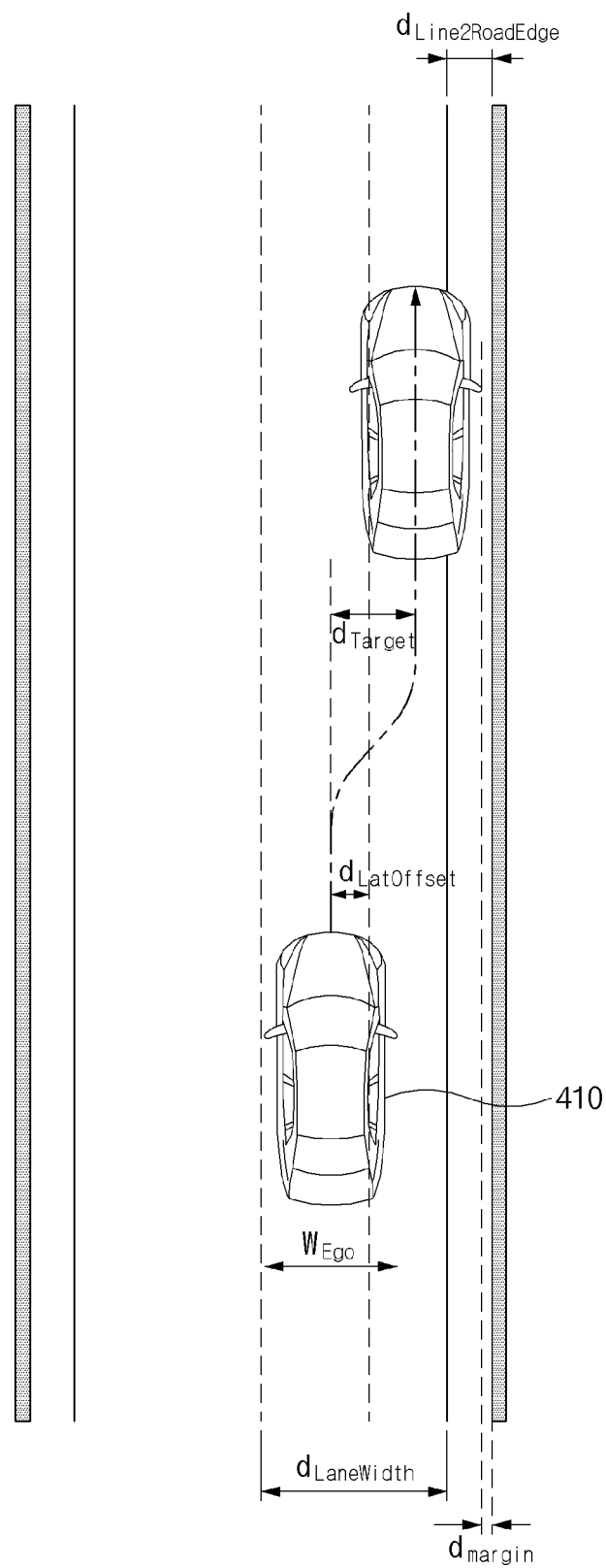
FIG. 4 is a drawing illustrating an exemplary operation of an apparatus for providing a safety strategy in a vehicle in one form of the present disclosure.

FIG. 4 is a drawing illustrating an exemplary operation of an apparatus for providing a safety strategy in a vehicle in some forms of the present disclosure.

Referring to FIG. 4, a vehicle 410 in some forms of the present disclosure may calculate a target lateral location $d_{Target}$ in consideration of a current lateral location $d_{LatOffset}$ of the vehicle 410 from the center of a driving lane, a width $d_{LaneWidth}$ of the driving lane, a distance $d_{Line2RoadEdge}$ between a line and a road edge, a width $W_{Ego}$ of the vehicle 410, a safety distance $d_{margin}$, and the like. An exemplary equation for calculating the target lateral location $d_{Target}$ is Equation 1 below.

$$d_{target} = d_{LatOffset} + \frac{d_{LaneWidth}}{2} + d_{Line2RoadEdge} - \frac{W_{Ego}}{2} - d_{margin} \quad \text{[Equation 1]}$$

The vehicle 410 may calculate a path for moving from the current lateral location $d_{LatOffset}$ to the target lateral location $d_{Target}$ in a lateral direction. The path may be calculated as, for example, a cubic plane curve which connects the current lateral location $d_{LatOffset}$ with the target lateral location $d_{Target}$. The vehicle 410 may control itself along the calculated path.

Figure 5:
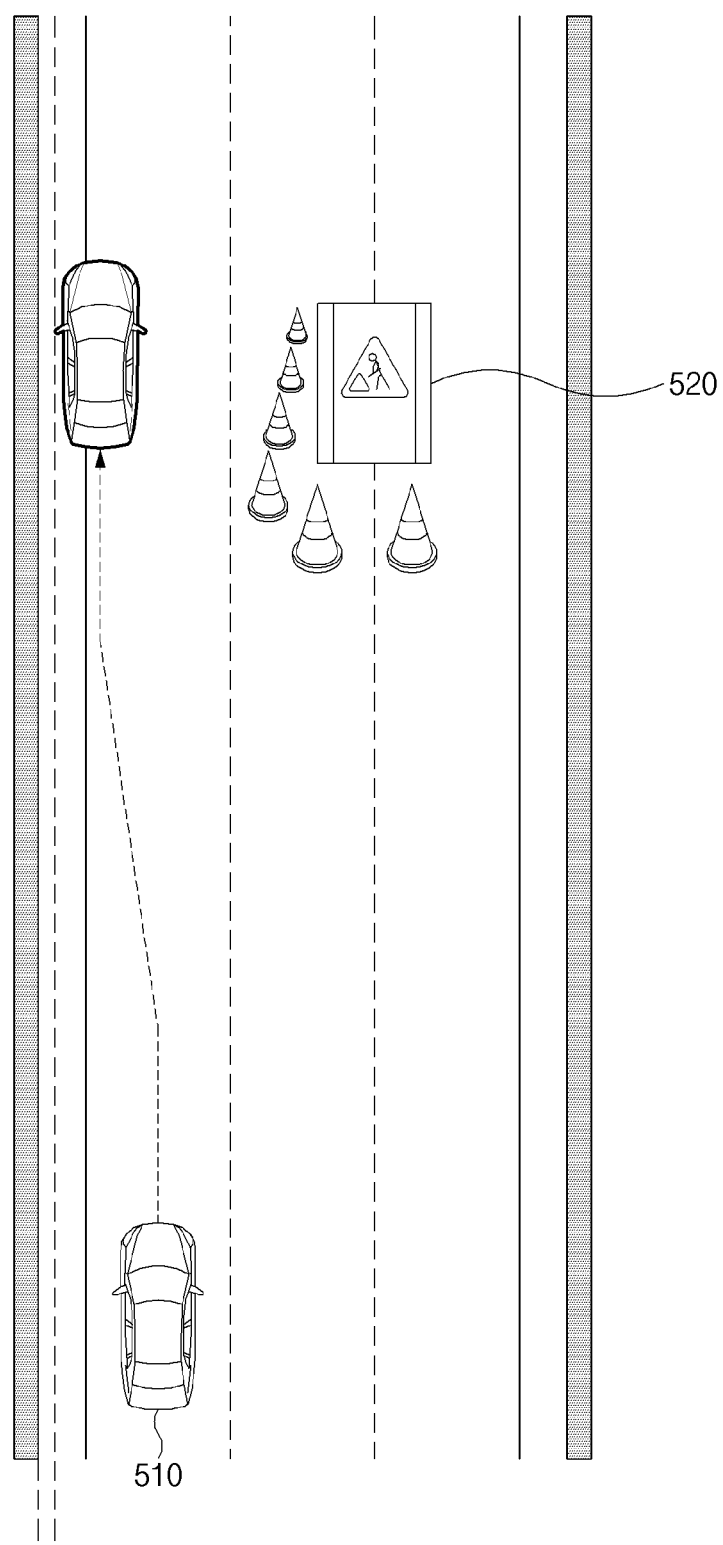
FIG. 5 is a drawing illustrating an exemplary operation of an apparatus for providing a safety strategy in a vehicle in one form of the present disclosure.

FIG. 5 is a drawing illustrating an exemplary operation of an apparatus for providing a safety strategy in a vehicle in some forms of the present disclosure.

Referring to FIG. 5, a vehicle 510 in some forms of the present disclosure may be traveling on a lane adjacent to a left end of a road. The vehicle 510 may perform autonomous control using an autonomous system. While performing the autonomous control, the vehicle 510 may detect an event for requiring to hand over control authority. The vehicle 510 may request its driver to hand over control authority. When the driver does not take over the control authority, the vehicle 510 may initiate an MRM. When the vehicle 510 is traveling on the lane adjacent to the left end of the road, it may execute a strategy for stopping on a location adjacent to the left end of the road. For example, the vehicle 510 may stop on a location away from the left end of the road at a specified distance. Meanwhile, the vehicle 510 may detect an external object 520. It may be difficult to perform a lane change to a right lane due to the external object 520. Thus, the vehicle 510 may execute a strategy for stopping on the location adjacent to the left end of the road without moving to a right end of the road.

Figure 6:
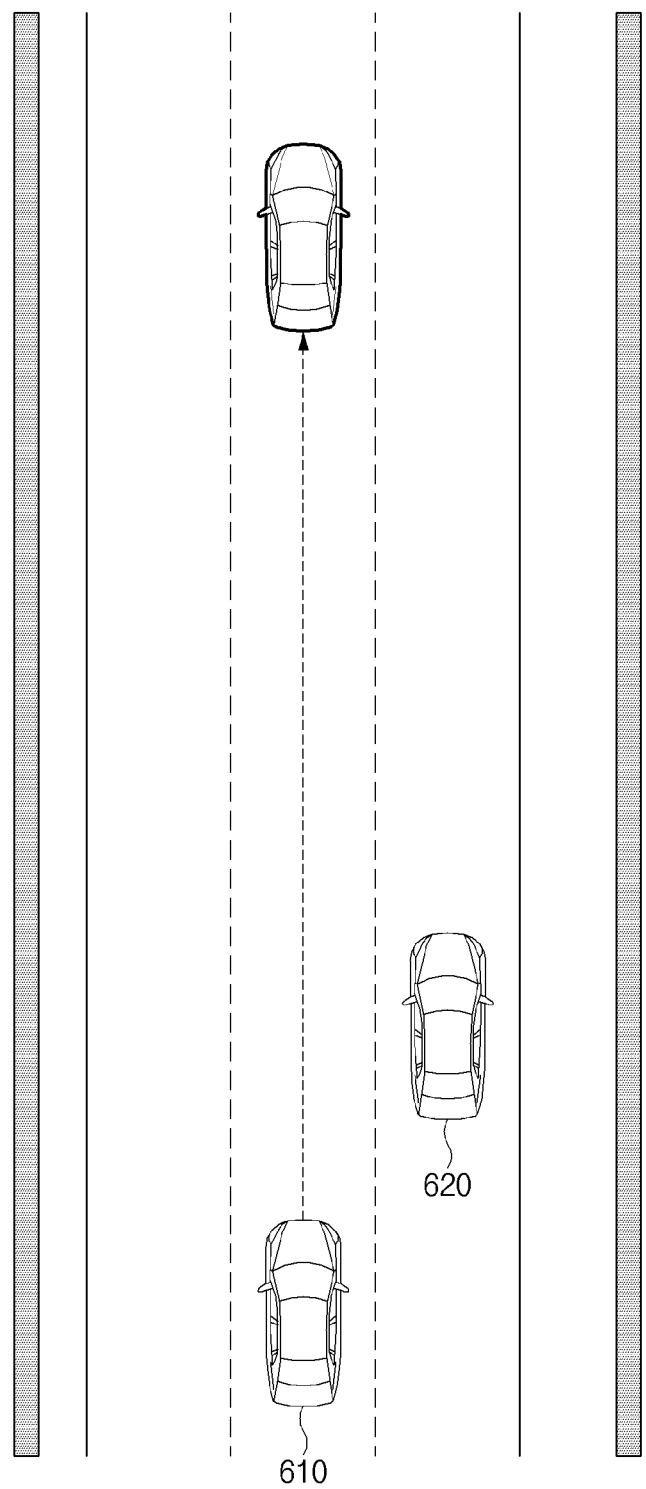
FIG. 6 is a drawing illustrating an exemplary operation of an apparatus for providing a safety strategy in a vehicle in one form of the present disclosure.

FIG. 6 is a drawing illustrating an exemplary operation of an apparatus for providing a safety strategy in a vehicle in some forms of the present disclosure.

Referring to FIG. 6, a vehicle 610 in some forms of the present disclosure may be traveling on the center of a lane of a road. The vehicle 610 may perform autonomous control using its autonomous system. While performing the autonomous control, the vehicle 610 may detect an event for requiring to hand over control authority. The vehicle 610 may request its driver to hand over control authority. When the driver does not take over the control authority, the vehicle 610 may initiate an MRM. When the vehicle 610 is traveling on the center of the lane of the road, it may execute a strategy for stopping or decelerating in a driving lane. Meanwhile, the vehicle 610 may detect an external object 620. It may be difficult to perform a lane change to a right lane due to the external object 620 although there is a shoulder in the lane. Thus, the vehicle 610 may execute a strategy for stopping in the driving lane without moving to the right lane.

Figure 7:
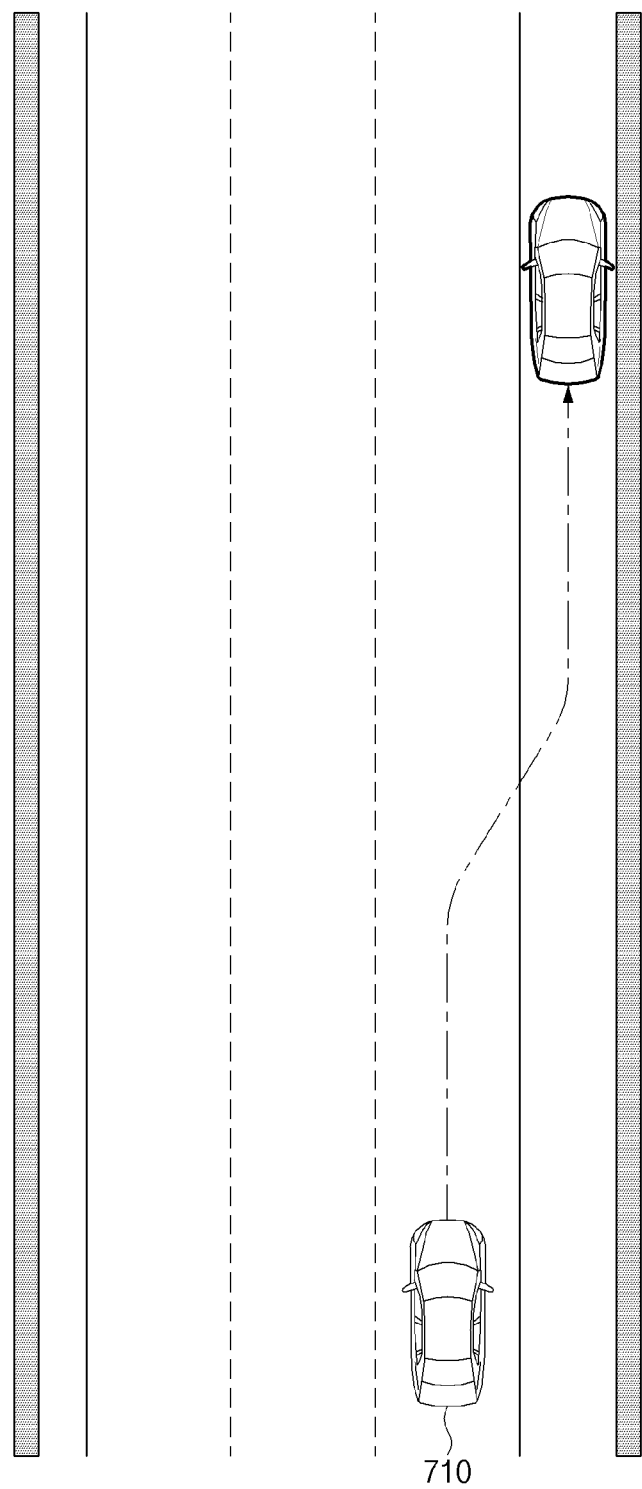
FIG. 7 is a drawing illustrating an exemplary operation of an apparatus for providing a safety strategy in a vehicle in one form of the present disclosure.

FIG. 7 is a drawing illustrating an exemplary operation of an apparatus for providing a safety strategy in a vehicle in some forms of the present disclosure.

Referring to FIG. 7, a vehicle 710 in some forms of the present disclosure may be traveling on a lane adjacent to a right end of a road. The vehicle 710 may initiate an MRM. When a road on which the vehicle 710 is traveling includes a shoulder, the vehicle 710 may execute a strategy for stopping in the shoulder included in the road. For example, the vehicle 710 may execute a strategy for performing a lane change to the shoulder and stopping in the shoulder.

Figure 8:
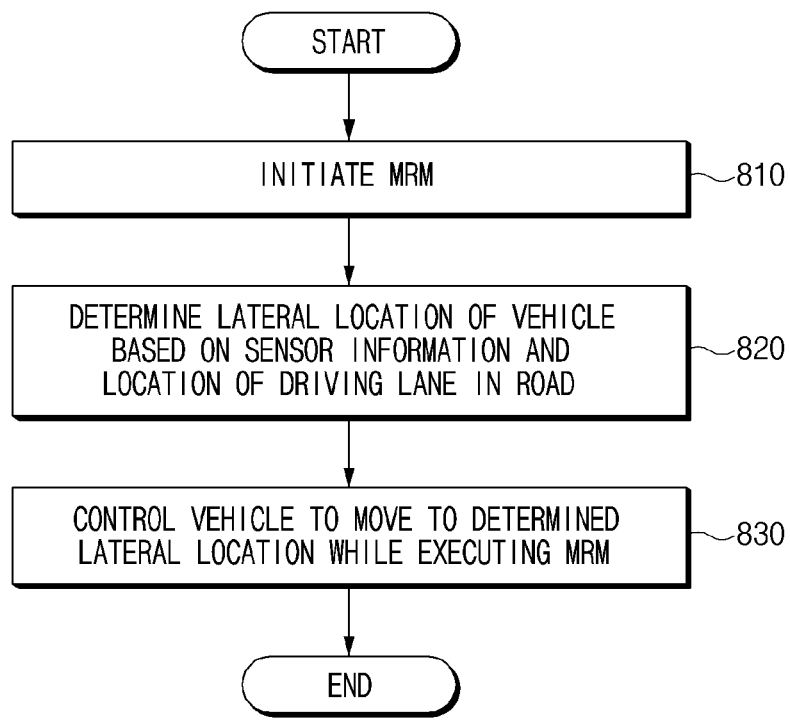
FIG. 8 is a flowchart illustrating a method for providing a safety strategy in a vehicle in one form of the present disclosure.

FIG. 8 is a flowchart illustrating a method for providing a safety strategy in a vehicle in some forms of the present disclosure.

Hereinafter, it is assumed that a vehicle including an apparatus 100 for providing a safety strategy in FIG. 1 performs a process of FIG. 8. Furthermore, in a description of FIG. 8, an operation described as being performed by the vehicle may be understood as being controlled by a control circuit 150 of the apparatus 100 for providing the safety strategy.

Referring to FIG. 8, in operation 810, the vehicle may initiate an MRM. For example, while the vehicle performs autonomous control, when an event for control authority transition occurs and when a driver of the vehicle does not take over control authority, the vehicle may execute the MRM.

In operation 820, the vehicle may determine its lateral location based on sensor information and a location of a driving lane of the vehicle in a road. For example, the vehicle may determine a target lateral location of the MRM in consideration of information about an external object, information about the road, and information about its current location. The target lateral location may be, for example, the center of a driving lane, a shoulder, or a location adjacent to a road edge.

In operation 830, while executing the MRM, the vehicle may control itself to move to the determined lateral location. For example, the vehicle may move to the location adjacent to the road edge and may perform stopping or deceleration control. For another example, the vehicle may perform stopping or deceleration control on the center of the lane. For another example, the vehicle may move to the shoulder and may perform stopping or deceleration control.

Figure 9:
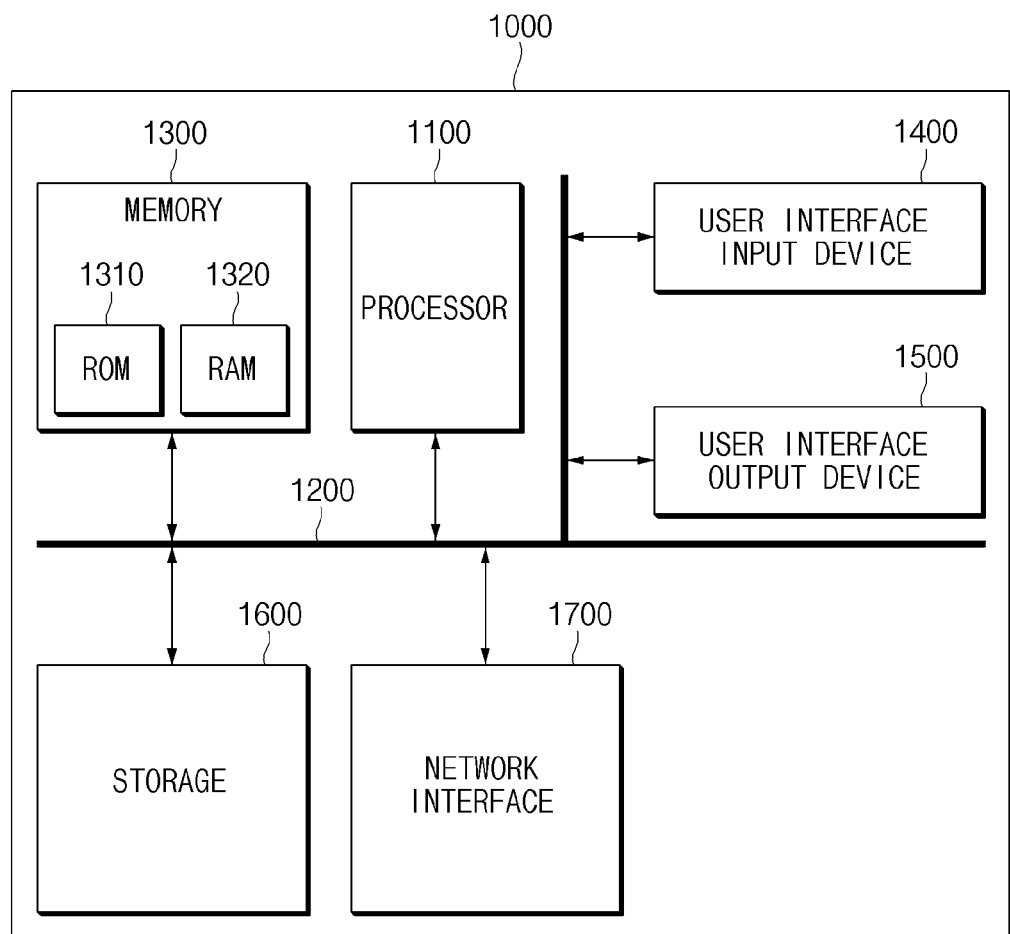
FIG. 9 is a block diagram illustrating a configuration of a computing system in one form of the present disclosure.

FIG. 9 is a block diagram illustrating a configuration of a computing system in some forms of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for providing the safety strategy in the vehicle in some forms of the present disclosure may enhance the safety of the vehicle in a relationship between the vehicle and a surrounding vehicle upon stopping or deceleration control by determining a target lateral location of the vehicle when executing an MRM based on sensor information and location information of the vehicle.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for providing a safety strategy in a vehicle,
the apparatus comprising:
a sensor configured to sense information about an external object; and
a control circuit electrically connected with the sensor and configured to:
initiate a minimum risk strategy (MRM) when a control authority is not transitioned after a transition demand occurs;
determine a lateral location of the vehicle based on the sensed information and a location of a driving lane of the vehicle on a road; and
move the vehicle to the determined lateral location during an execution of the MRM.

2. The apparatus of claim 1, wherein the control circuit is configured to:
stop or decelerate the vehicle based on the MRM.

3. The apparatus of claim 1, wherein the control circuit is configured to:
move the vehicle adjacent to one end of the road during the execution of the MRM when the driving lane is adjoining to the one end of the road.

4. The apparatus of claim 1, wherein the control circuit is configured to:
perform a lane change to a lane adjoining to the one end of the road when the driving lane is not adjoining to the one end of the road; and
move the vehicle adjacent to the one end of the road that is adjoining to the changed lane during the execution of the MRM.

5. The apparatus of claim 4, wherein the control circuit is configured to:
perform the lane change to either a lane adjoining to a left end of the road or a lane adjoining to a right end of the road such that the changed lane is close to the driving lane.

6. The apparatus of claim 4, wherein the control circuit is configured to:
perform the lane change to either the lane adjoining to the left end of the road or the lane adjoining to the right end of the road within a predetermined amount of time.

7. The apparatus of claim 1, wherein the control circuit is configured to:
move the vehicle to a center of the driving lane during the execution of the MRM when the driving lane is not adjoining to the one end of the road.

8. The apparatus of claim 7, wherein the control circuit is configured to:
move the vehicle to the center of the driving lane when performing the lane change within the predetermined amount of time is not possible.

9. The apparatus of claim 1, wherein the control circuit is configured to:
move the vehicle to a shoulder during the execution of the MRM when the shoulder is included in the road.

10. The apparatus of claim 9, wherein the control circuit is configured to:
move the vehicle to the shoulder when performing the lane change to the shoulder within the predetermined amount of time is possible.

11. A method for providing a safety strategy in a vehicle, the method comprising:
when a control authority is not transitioned after a transition demand occurs, initiating, with a control circuit, a minimum risk strategy (MRM);
determining, with the control circuit, a lateral location of the vehicle based on sense information about an external object and a location of a driving lane of the vehicle on a road; and moving, with the control circuit, the vehicle to the determined lateral location during an execution of the MRM.

12. The method of claim 11, wherein moving the vehicle comprises:
stopping or deceleration, with the control circuit, the vehicle based on the MRM.

13. The method of claim 11, wherein moving the vehicle comprises:
moving, with the control circuit, the vehicle adjacent to one end of the road during the execution of the MRM when the driving lane is adjoining to the one end of the road.

14. The method of claim 11, wherein moving the vehicle comprises:
when the driving lane is not adjoining to the one end of the road, performing, with the control circuit, a lane change to a lane adjoining to the one end of the road; and
moving, with the control circuit, the vehicle adjacent to the one end of the road that is adjoining to the changed lane during the execution of the MRM.

15. The method of claim 11, wherein moving the vehicle comprises:
when the driving lane is not adjoining to the one end of the road, moving, with the control circuit, the vehicle to a center of the driving lane during the execution of the MRM.

\* \* \* \* \*